Patented Nov. 27, 1951

2,576,521

UNITED STATES PATENT OFFICE 2,576,521

OPTICAL GLASS

Norbert J. Kreidl, Brighton, and Gordon F. Brewster, Williamson, N. Y., assignors to Bausch & Lomb Optical Company, Rochester, N. Y., a corporation of New York No Drawing. Application May 15, 1950, Serial No. 162,139

4 Claims. (Cl. 106—54)

This invention relates to barium crown optical glasses of the type which are used to make the minor lenses or segments in fused, multifocal, ophthalmic lenses. In certain types of such fused lenses, it is desirable that the segment be formed of a glass having a refractive index of about 1.65–1.665 in order to keep the segment thickness to a minimum for the segments which must provide a relatively high dioptric power. The segment glass should also have a reciprocal relative dispersion, as expressed by "$\nu$" (Greek letter Nu), of about 45–60 in order to reduce the chromatic aberration in the finished lens. In addition, the segment glass should have the proper coefficient of expansion and viscosity so that it will fuse properly with the major blank of crown glass to provide a fused multifocal lens. The segment glass must also have a sufficient chemical durability so that the glass will be resistant to surface stains and tarnishing due to atmospheric effects. Such glasses, however, which have expansion values, high indices, high reciprocal dispersion values and low viscosities are characterized by low chemical durabilities.

It is an object of this invention to overcome the above-mentioned objections and provide barium crown optical glasses having relatively high indices, high reciprocal relative dispersion values, high coefficients of expansion and high chemical durabilities. Another object is to provide an improved barium crown glass which will fuse efficiently to the standard crown optical glass while still having a relatively high refractive index, a high reciprocal relative dispersion and a high chemical durability.

We have discovered that these objects may be attained by adding either tantalum oxide or niobium oxide (formerly called columbium oxide) to the batch in amounts of about 1%–10% by weight. The tantalum or niobium oxide is used in the batch together with lithium, lanthanum and zirconium oxides and, in addition, titanium oxide may or may not be used.

Glasses embodying our invention comprise, by weight, 20%–35% $SiO_2$, 25%–45% BaO, 0–5% ZnO, 5%–10% $B_2O_3$, 0–2% $Al_2O_3$, 1%–5% $Li_2O$, 1%–5% $Na_2O$, 1%–5% $La_2O_3$, 3%–10% $ZrO_2$, 0–3% TiO, and 1%–10% of either $Ta_2O_5$ or $Nb_2O_5$.

Niobium oxide may be substituted for tantalum oxide in equimolecular amounts since both of these materials have substantially identical chemical and optical actions.

The following batch compositions, given in weight percentages, are by way of example of our invention:

|  | I | II | III |
|---|---|---|---|
| $SiO_2$ | 30.12 | 31.72 | 31.01 |
| BaO | 37.28 | 37.68 | 38.38 |
| ZnO | 2.75 | 2.90 | 2.83 |
| $B_2O_3$ | 6.76 | 7.16 | 6.96 |
| $Al_2O_3$ | 1.11 | 1.17 | 1.14 |
| $Li_2O$ | 2.87 | 3.04 | 2.95 |
| $Na_2O$ | 1.62 | 1.71 | 1.67 |
| $La_2O_3$ | 3.55 | 1.87 | 3.66 |
| $ZrO_2$ | 6.72 | 7.07 | 6.92 |
| $Ta_2O_5$ | 7.22 | 3.80 |  |
| $TiO_2$ |  | 1.88 |  |
| $Nb_2O_5$ |  |  | 4.48 |
|  | 100.00 | 100.00 | 100.00 |
| nD | 1.667 | 1.665 | 1.663 |
| $\nu$ | 50.0 | 48.7 | 50.7 |

The prior art barium crown glasses which have relatively high refractive indices and reciprocal relative dispersions are not very durable since a film will be formed on the surface of such a glass almost immediately upon the application of a 1% nitric acid solution at 25° C. In comparison, the glasses embodying our invention not only have relatively high refractive indices and reciprocal relative dispersions but have much greater chemical durabilities since it requires about 10 minutes for a 1% nitric acid solution at 25° C. to produce a film thereon. Our glasses also are characterized by a relatively high coefficient of expansion, namely, about 100·10⁻⁶ cm. per cm. per degree C. so that they will fuse properly to standard crown ophthalmic glass.

We claim:

1. An optical glass having a refractive index of about 1.665 and a reciprocal relative dispersion of about 48.7 and comprising 31.72% $SiO_2$, 37.68% BaO, 2.90% ZnO, 7.16% $B_2O_3$, 1.17% $Al_2O_3$, 3.04% $Li_2O$, 1.71% $Na_2O$, 1.87% $La_2O_3$, 7.07% $ZrO_2$, 3.80% $Ta_2O_5$ and 1.88% $TiO_2$.

2. A barium crown optical glass comprising 20%–35% $SiO_2$, 25%–45% BaO, 5%–10% $B_2O_3$, 1%–5% $Li_2O$, 1%–5% $Na_2O$, 1%–5% $La_2O_3$, 3%–10% $ZrO_2$ and 1%–10% of the oxide selected from the group consisting of the oxides of tantalum and niobium.

3. A barium crown optical glass comprising 20%–35% $SiO_2$, 25%–45% BaO, 5%–10% $B_2O_3$, 1%–5% $Li_2O$, 1%–5% $Na_2O$, 1%–5% $La_2O_3$, 3%–10% $ZrO_2$, up to 5% of ZnO, up to 2% $Al_2O_3$ and 1%–10% of the oxide selected from the group consisting of the oxides of tantalum and niobium.

4. A barium crown optical glass comprising 20%–35% $SiO_2$, 25%–45% BaO, 5%–10% $B_2O_3$, 1%–5% $Li_2O$, 1%–5% $Na_2O$, 1%–5% $La_2O_3$, 3%–10% $ZrO_2$, up to 5% of ZnO, up to 2% $Al_2O_3$, up to 3% TiO₂ and 1%–10% of the oxide selected from the group consisting of the oxides of tantalum and niobium.

NORBERT J. KREIDL.
GORDON F. BREWSTER.

REFERENCES CITED

The following references are of record in the file of this patent:

UNITED STATES PATENTS

| Number | Name | Date |
|---|---|---|
| 2,518,028 | Kreidl | Aug. 8, 1950 |